United States Patent [19]

Barratt

[11] Patent Number: 4,741,137
[45] Date of Patent: May 3, 1988

[54] BRICK FACING SYSTEM

[75] Inventor: William C. Barratt, Niagara Falls, Canada

[73] Assignee: W. C. Barratt Construction Ltd., Niagara Falls, Canada

[21] Appl. No.: 893,252

[22] Filed: Aug. 5, 1986

[51] Int. Cl.⁴ .............................................. E04B 1/00
[52] U.S. Cl. ......................................... 52/314; 52/391; 52/511; 264/136
[58] Field of Search ................. 52/314, 315, 391, 506, 52/511, 588, 309.8

[56] References Cited

U.S. PATENT DOCUMENTS 3,559,358 2/1971 Lohse et al. ................ 52/391 X
4,407,104 10/1983 Francis ...................... 52/314 X
4,457,249 7/1984 Disen ........................ 52/588 X

FOREIGN PATENT DOCUMENTS 451221 9/1949 Italy ............................ 52/314
1025606 4/1966 United Kingdom ............ 52/314

Primary Examiner—J. Karl Bell
Attorney, Agent, or Firm—Bachman & LaPointe

[57] ABSTRACT

An ornamental facing structure has an elongate base supporting a plurality, typically four, of facing members, which may simulate bricks, in side-by-side relationship; the structure has a thin bar for insertion into a narrow elongate slot in a surface on which the facing structure is to be mounted; the facing structures can be readily applied in side-by-side relationship to face a wall surface.

15 Claims, 4 Drawing Sheets

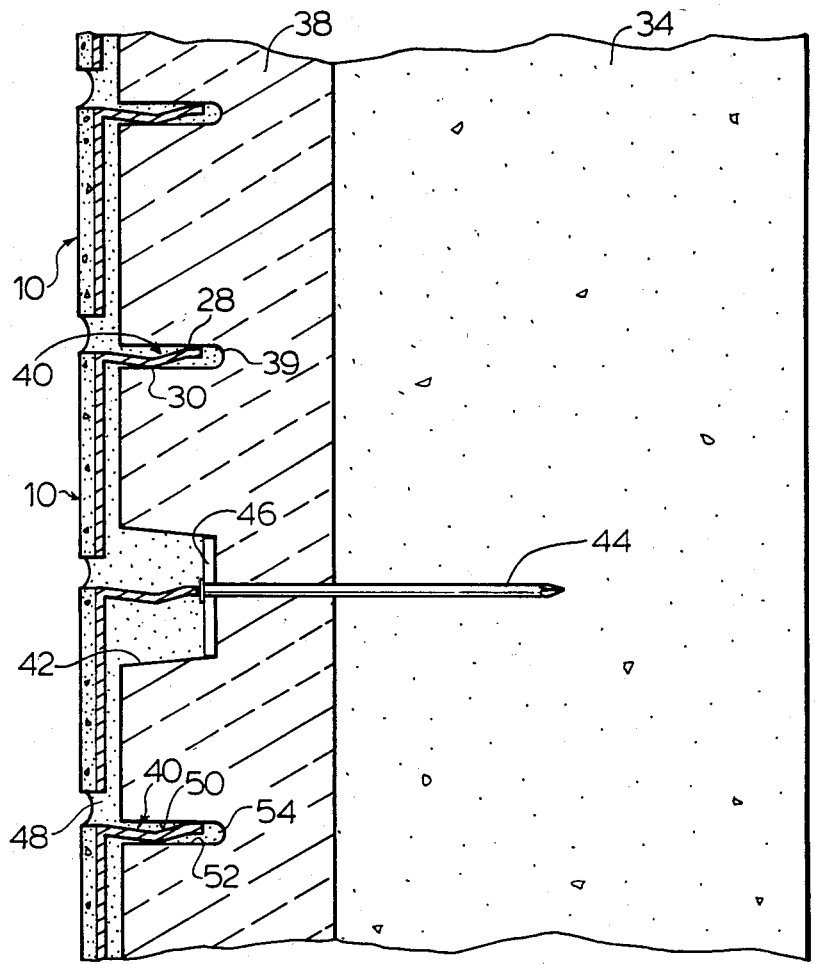
FIG.3.
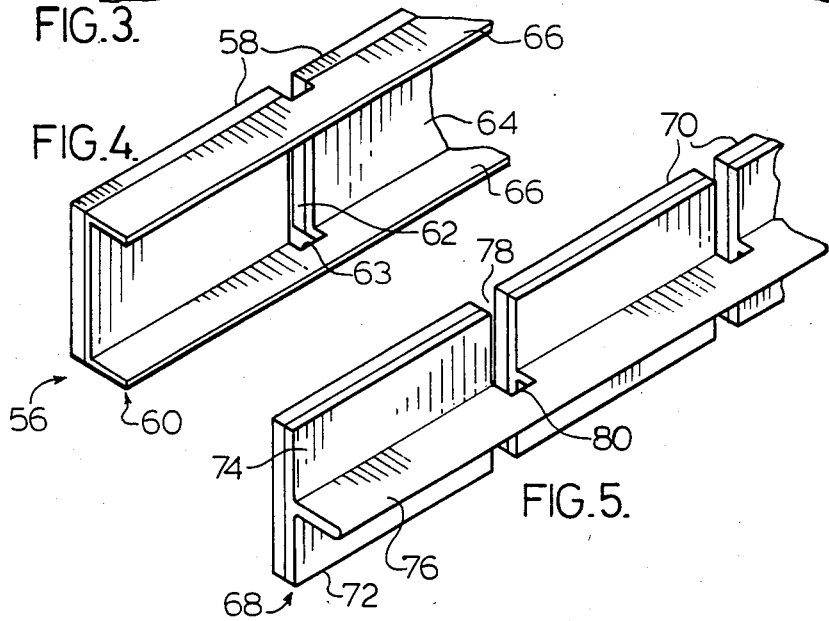
FIG.4.
FIG.5.

BRICK FACING SYSTEM

BACKGROUND OF THE INVENTION (i) Field of the Invention

This invention relates to ornamental facing structures, their manufacture and use and faced walls; more especially the invention is concerned with simulated brick facing structures.

(ii) Description of the Prior Art

Various proposals have been made for applying simulated bricks to wall surfaces and simulated tiles to wall or floor surfaces.

U.S. Pat. No. 3,701,228—Taylor describes a simulated brick wall comprising a backing panel having retaining apertures for securing individual brick facings; U.S. Pat. No. 3,683,579—Beardsley similarly shows individual brick facings which are nailed to a surface, a compressible backing sheet simulating mortar being sandwiched between the surface and the brick facings. In both of these structures discrete brick elements or facings are applied individually.

U.S. Pat. No. 2,046,213—Schnurer describes a structure in which an expanse of brick facings is formed as a unit for application. The brick facings are formed on a slab of cementitious material for application to a wall surface, and the slab has holes for nailing the unit to a wall.

U.S. Pat. Nos. 2,049,427; 2,049,428; 2,049,429 all of Denk and 4,076,876—Van Gasse, are all concerned with tile mountings. In the Denk Patents discrete tile facing elements have connecting members to locate them in spaced relationship on an insulation board. In U.S. Pat. No. 4,076,876, tiles of different sizes are connected by bridgings of the same material as the tile, the tiles and bridgings being moulded in one action.

Disadvantages of these prior proposals are that their structures and manufacture are complex, installation is expensive and time consuming, holes formed in the mounting surface become filled with mortar which makes it difficult to locate and mount the brick or tile structures; and the shape of the structures is inconvenient for compact storage and transfer.

SUMMARY OF THE INVENTION

It is an object of the invention to provide an ornamental facing structure comprising an array of facing elements formed as a unitary structure.

It is a further object of the invention to provide a method whereby such facing structures can be formed in a continuous in-line operation.

It is still a further object of the invention to provide a method of installing a faced surface.

It is yet another object of the invention to provide a faced surface defined by a plurality of facing structures.

In accordance with the invention there is provided an ornamental facing structure comprising an elongate base and at least one facing member supported on a first side of the base, and preferably a plurality, in spaced apart side-by-side relationship. At least one thin bar is integrally formed with the base and extends generally perpendicularly from a second side of the base. The at least one thin bar is adapted to be received in a narrow elongate slot in a base structure to mount the facing structure on the base structure.

In accordance with another aspect of the invention a simulated masonry wall comprises a backing panel; a plurality of parallel, equally spaced apart narrow elongate slots in the panel, the slots being separated by elongate mounting surfaces. The mounting surfaces have a layer of mortar thereover and a plurality of the facing structures of the invention. The facing structures are fixedly mounted in side-by-side relationship on each mounting surface by the layer of mortar and by the bars which are received in the slots.

In another aspect of the invention there is provided a method of making an ornamental facing structure in which a wide panel of resin impregnated fibre mat is progressively formed with spaced-apart flange-forming members extending generally perpendicularly therefrom. The spacing of the flange-forming members corresponds to the spacing of a plurality of side-by-side identical sections of the panel. A layer of facing material is formed on the panel and the panel is progressively separated into sections by sequentially severing an end section from the remainder of the panel.

In still another aspect of the invention there is provided a method of facing a wall structure in which a backing panel is applied to a wall structure. A plurality of parallel, equally spaced apart narrow elongate slots is provided in the panel, the slots being spaced apart by elongate mounting surfaces.

A layer of mortar is applied on the panel over the mounting surfaces and a plurality of facing structures of the invention is fixedly mounted over the mortar with the bars received in the slots and the facing structures in adhering contact with the layer of mortar. The facing structures are fixedly mounted in rows in side-by-side relationship.

DESCRIPTION OF THE PREFERRED EMBODIMENTS

In particular the facing structure has a single bar extending the full elongate length of the base. Preferably the bar extends generally perpendicularly of the base from an upper elongate edge, however, it may also extend from intermediate the upper and lower elongate edges of the base; the bar may also have a pair of bars extending from the upper and lower elongate edges respectively.

The bars are thin having a thickness less than the thickness of the facing members and in particular less than 0.125 inches.

The bar extends from the base a distance which is significantly greater than the bar thickness and typically at least 10 times greater.

The thin bar is thus receivable in a narrow slot in the base structure or backing panel of a wall structure. The advantage of narrow slots is that the tendency of mortar to enter during application of mortar to the base structure or backing panel is minimized as compared with large openings, so that the slots remain substantially empty or unfilled by mortar and full entry of the bars is not hindered or obstructed. The slots may suitably have enlarged inner terminal ends. During entry of the bars, any mortar in the slots, particularly at the outer outlet ends, is urged towards and forced into the enlarged terminal ends. The enlarged ends thus house the collected mortar which hardens about the outer ends of the bars to form mechanical anchors for the bars to more securely fix the facing structures.

Conveniently the bars may be profiled so as to mechanically or frictionally engage opposed side walls of the slots and this also assists in securely fixing the facing structures in place.

The base and bar are suitably formed from a fibre glass mat impregnated with resin and the facing members are conveniently formed from a mixture of sand and resin with colouring pigment or dye as required.

BRIEF DESCRIPTION OF DRAWINGS

The invention is illustrated in particular and preferred embodiments by reference to the accompanying drawings, in which:

FIG. 3 is a cross-sectional side elevation of a faced wall structure formed from facing structures of FIG. 1 and the prepared wall surface of FIG. 2;

FIG. 4 is a perspective view, part broken away of a facing structure of the invention in another embodiment;

FIG. 5 is a perspective view, part broken away, of a facing structure of the invention in yet another embodiment.

DESCRIPTION OF PREFERRED EMBODIMENTS WITH REFERENCE TO THE DRAWINGS

Figure 1:
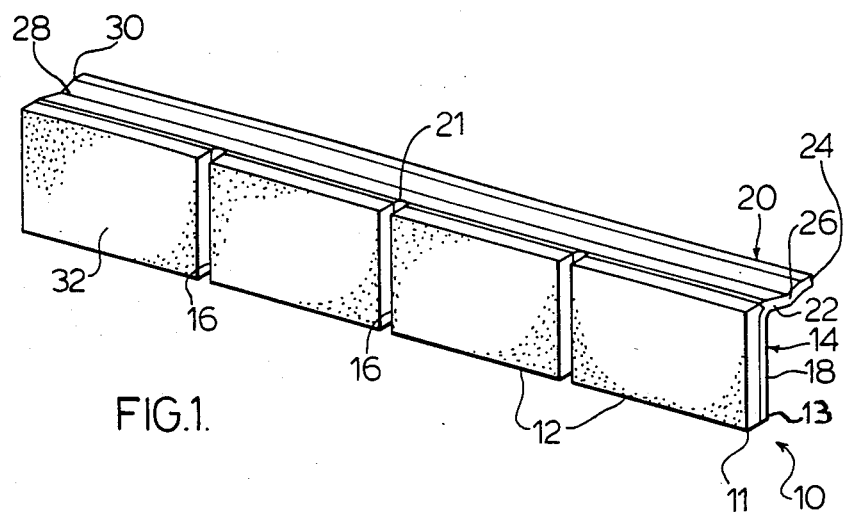
FIG. 1 is a perspective view of a facing structure of the invention.

With further reference to FIG. 1 a facing structure 10 includes a plurality of plate-like facings 12 and an elongate support member 14. Slots or openings 16 extend between adjacent facings 12 terminating in notches 21 in support member 14.

Support member 14 has a base 18 and a tongue or bar 20. Tongue 20 has an inner end 22, an outer end 24 and an intermediate portion 26. Intermediate portion 26 is inclined with respect to inner end 22 and outer end 24 to form an outer V-portion 28 between intermediate portion 26 and outer end 24 and an inner V-portion 30 between inner end 22 and intermediate portion 26.

Facing structure 10 has a front edge 11 and a rear edge 13; base 18 has a major front surface 19 and a major rear surface 23; and the facing 12 have decorative faces 32.

Figure 2:
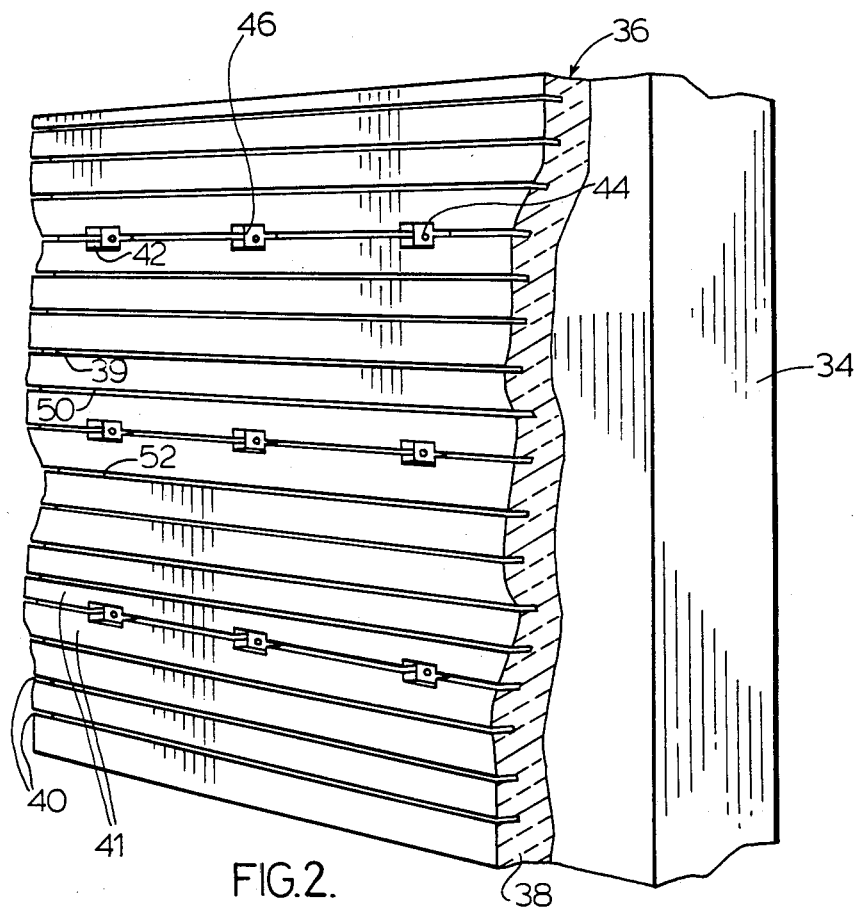
FIG. 2 is a perspective view of a wall having a prepared surface for receiving facing structures of FIG. 1.

With further reference to FIG. 2, there is shown a wall 34 having a mounting surface 36 for receiving a plurality of facing structures 10 of FIG. 1.

Mounting surface 36 comprises an insulating layer 38 which may, for example, be of expanded polystyrene. Insulating layer 38 has a plurality of parallel channels 40 therein separated by rectangular support surfaces 41; a plurality of spaced apart cavities 42 communicate with the channels 40.

The channels 40 have upper and lower walls 50 and 52 respectively terminating in an enlarged end 39.

Nail plates 46 are located in cavities 42 and nails 44 extend through the nail plates 46 and insulating layer 38 into wall 34 to securely locate insulating layer 38 on wall 34, as more particularly shown in FIG. 3.

In order to apply facing structures 10 to mounting surface 36, mortar is applied over mounting surface 36, particularly on the support surfaces 41. The channels 40 are relatively narrow typically having a width of about 0.0625 inches whereby only small amounts of mortar enter channels 40 during the application. The mortar is particularly applied over an area of mounting surface 36 on which a facing structure 10 is to be mounted. Thereafter, the facing structure 10 is mounted on surface 36 by inserting tongue 20 into the appropriate channel 40 and forcing base 18 against the mortared surface so that tongue 20 extends into channel 40 and base 18 overlies support surface 41. The apex of V-portion 28 frictionally or mechanically engages upper wall 50 and the apex of V-portion 30 frictionally or mechanically engages lower wall 52 thereby securely holding facing structure 10 on support surface 41. During entry of tongue 20 into channel 40 any mortar present in the channel 40 particularly in the open end of channel 40, is pushed inwardly of channel 40 by tongue 20 towards enlarged end 39 and hardens to a solid bulb or anchor in end 39 encasing the terminal portion of outer end 24 which assists in locking tongue 20 in place. Additionally, the solidification of the mortar 48 between base 18 and support surface 41 serves to secure facing structure 10. Thus, facing structure 10 is secured by three means on mounting surface 36, by the frictional or mechanical engagement between tongue 20 and walls 50 and 52 of channel 40, by the locking action of mortar in the enlarged end 39 of channel 40 and by mortar between base 18 and support surface 36.

The support surfaces 41 are all in substantially the same plane and the channels 40 are equally spaced apart, the facing structures being readily applied in side-by-side relationship to form horizontal rows covering surface 36.

With further reference to FIG. 4, a facing structure 56 comprises plate-like facings 58 and an elongate support member 60. Parallel grooves 62 extend between adjacent facings 58 and terminate in notches 63 in support member 60. Support member 60 includes a web 64 and opposed flanges or bars 66.

With further reference to FIG. 5, a facing structure 68 includes a plurality of plate-like facings 70 and an elongate T-shaped support 72. Support 72 has a base 74 with a rib or bar 76.

Parallel grooves 78 extend between adjacent facings 70 terminating in notches 80 which extend into rib 76.

The facing structures 56 and 68 are applied to a mounting surface 36 as shown in FIG. 2, substantially as described for facing structure 10 of FIG. 1.

Figure 6:
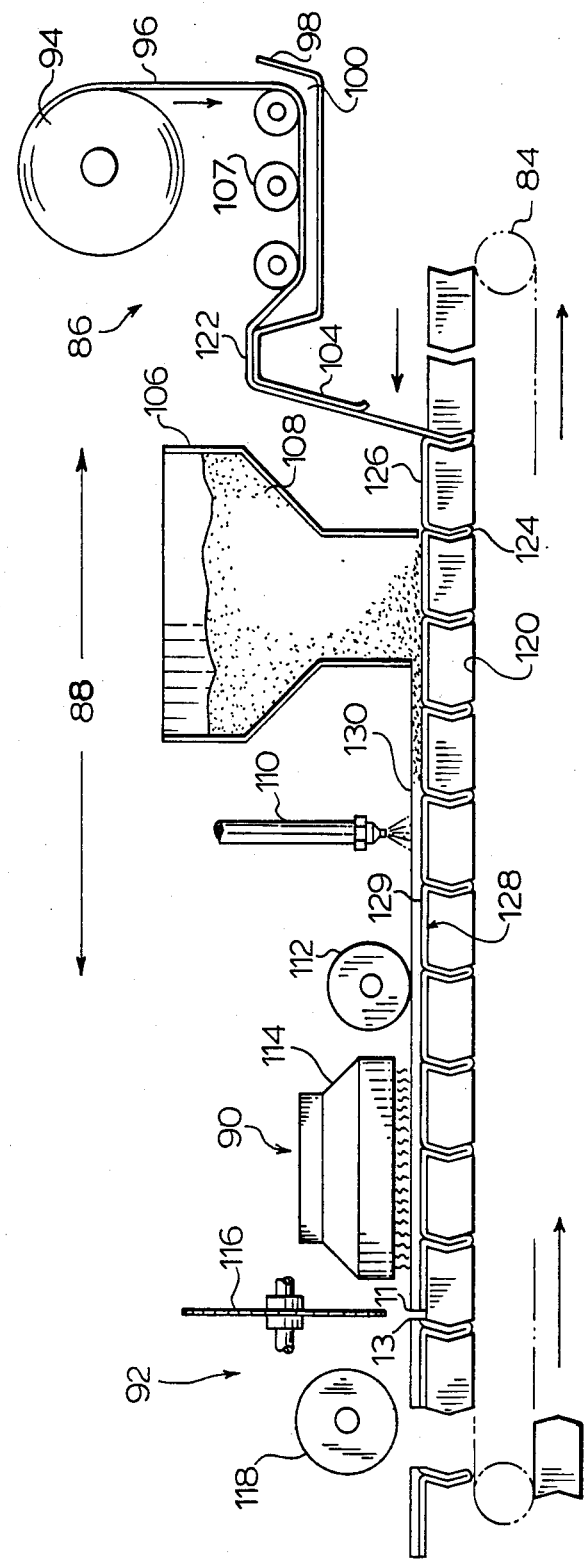
FIG. 6 is a schematic representation of an in-line process for manufacturing the facing structures of FIG. 1 on a continuous basis.

With further reference to FIG. 6, there is shown an assembly 82 being employed to produce facing structures 10 of FIG. 1 in a continuous in-line process.

Assembly 82 includes a conveyor 84, a resin impregnating station 86, a facing station 88, a curing station 90 and a cutting station 92.

Resin impregnating station 86 includes a supply roll 94 for continuous delivery of a fibre glass mat 96, a bath 98 containing resin 100, guide rolls 102 in bath 98 and a guide plate 104.

Facing station 88 includes a spreader box 106 containing a sand/resin mixture 108, a spray nozzle 110 and a facing roller 112.

Curing station 90 comprises a heating chamber 114.

Cutting station 92 comprises a vertically adjustable separation saw 116 and a vertically adjustable wheel saw 118.

In operation a plurality of spaced apart preformed blocks 120 are conveyed by conveyor 84. The preformed blocks 120 may, for example, be permanently secured to conveyor 84, and are in spaced apart relationship at least in the top horizontal part of their path of travel illustrated in FIG. 6.

Fibre glass mat 96 is fed from roll 94 through resin 100 in bath 98, being guided by rolls 102 and thence over guide plate 104 and is draped over the advancing preformed blocks 120 to form a double layer 124 between adjacent blocks 120 and a single layer 126 on the top surface of each block. The single layers 126 of adjacent blocks 120 form a wide panel 128 having a generally continuous top surface 129.

Sand/resin mixture 108 is applied to the surface 129 of wide panel 128 from spreader box 106 to form a coating layer 130 and colouring material is applied to coating layer 130 from spray nozzle 110.

Facing roller 112 engages coating layer 130 to produce a desired decorative face, for example, a textured or a smooth face.

During travel of the blocks 120 under heating chamber 114, the resin in the coating layer 130 and in the double layer 124 and single layer 126 is cured.

Separating saw 116 applies a continuous cut through coating layer 130 and the underlying single layer 126 immediately upstream of each double layer 124, along the full width of panel 128. Thereafter, wheel saw 118 forms a plurality of spaced apart cuts in the direction of travel extending completely through coating layer 130 and partially into single layer 126.

It can likewise be seen that the saw 116 simultaneously forms the front edge 11 of once facing structure 10 and the rear edge 13 of the adjacent facing structure 10.

After the operation of wheel saw 118 the blocks 120 are removed or released to leave the finished facing structure 10. Thereafter the blocks 120 are recycled to the first stage. In order to provide release of the formed facing structure 10 from the blocks 120, the blocks 120 are provided with a suitable release surface, for example, polyethylene faces or coatings of release agent, for example, silicone based release agents may be applied periodically as required.

The assembly 82 may similarly be employed to produce the facing structure 56 of FIG. 4 or the facing structure 68 of FIG. 5. The particular facing structure produced is determined by the location of the separating cut produced by separating saw 116. Thus, to produce facing structure 56 of FIG. 4, the cut is applied between the two layers of double layer 124, whereby each flange 66 is formed from a single layer of the resin impregnated mat 122.

If the separating cut formed by separating saw 116 is applied through coating layer 130 and single layer 126 between adjacent double layers 124 there is produced the facing structure 68 of FIG. 5 wherein each double layer 124 forms the rib 76.

It will be recognized that by means of the invention, the elements projecting into the parallel channels 40, namely the tongue 20 of facing structure 10, the flanges 66 of facing structure 56 and the rib 76 of facing structure 68 are of relatively small thickness, typically of the order of 0.0625 inches, whereby the channels 40 can similarly be formed of small width so that there is little tendency for mortar 48 to enter the channels 40 during application to surface 36, and in particular, mortar is located primarily only at the open ends of channels 40. During introduction of the tongue 20, flanges 66 or rib 76 respectively, mortar 48 is pressed into the channel, and particularly into the enlarged end 39.

If desired the open ends of the channels 40 can be masked during the application of mortar to mounting surface 36 by inserting rods or bars in the open ends.

After application of mortar to surface 36 the rods or bars are removed revealing the channels 40 substantially free of mortar.

Figure 7:
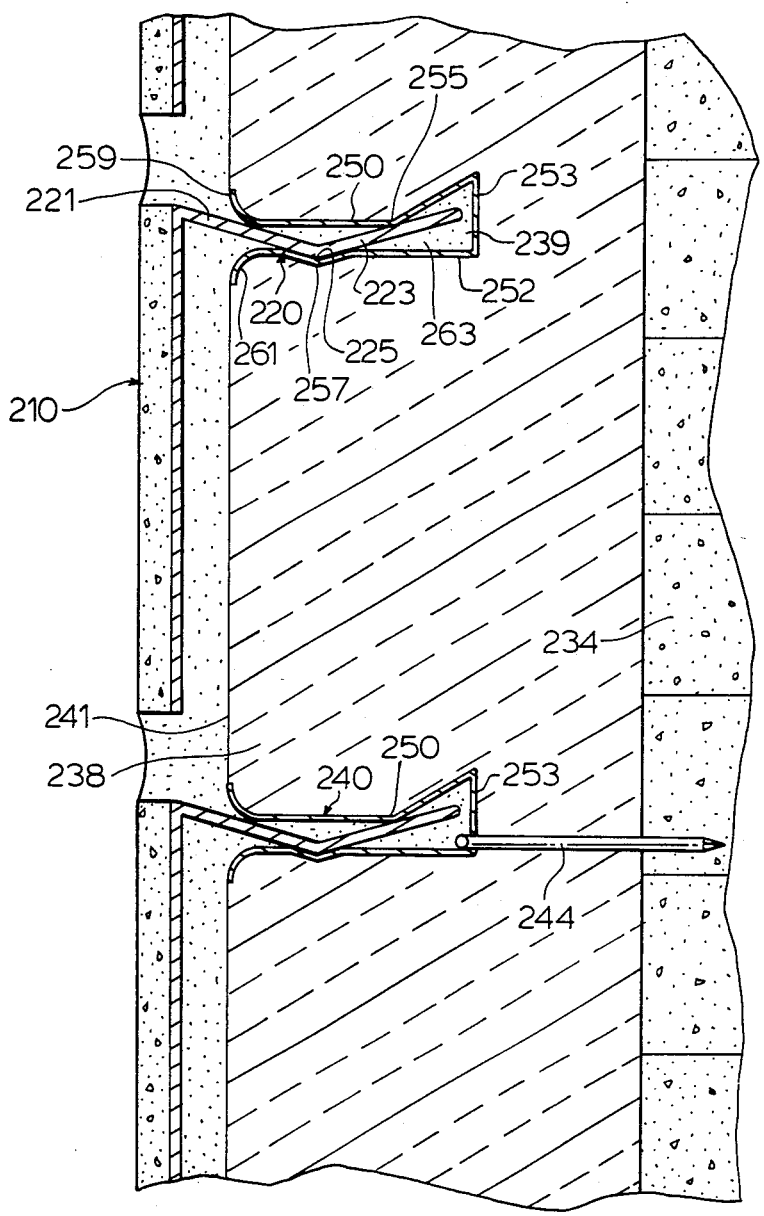
FIG. 7 is a varient of FIG. 3.

With further reference to FIG. 7, there is shown a side elevation similar to that of FIG. 3, in which facing structures 210 are mounted on rigid insulation board 238 secured to a wall 234. Structure 210 has a tongue 220 having an inner end 221 inclined to an outer end 223 with a V-portion 225 therebetween.

FIG. 7 differs from FIG. 3 particularly in that cavities 42 and channels 40 formed in layer 38 are replaced by preformed channel members 240 which house the tongues 220 of the structures 210 as well as the nails 244.

Each channel member 240 has an upper wall 250, a lower wall 252 and a generally flat end wall 253. Upper wall 250 has a V-shaped indent 255 and an elongate end 239 comparable to end 39 in FIG. 3. Lower wall 252 has a V-shaped indent 257 which is engaged by V-portion 225 of tongue 220.

Upper and lower walls 250 and 252 terminate in curved ends 259 and 261 respectively.

The channel members 240 are formed of metal or other material and provide a preformed groove 263. The upper and lower walls 250 and 252 suitably are of spring material or spring loaded such that they snap together but can be urged apart. Thus channel members 240 are suitably pressed into board 238 until curved ends 259 and 261 engage the outer surface 241. When tongue 220 is urged between the upper and lower walls 250 and 252 they are forced apart but snap into a locking position to securely engage tongue 20. In particular, as can be seen in FIG. 7, the tongue 20 is engaged at three positions by channel member 240. Engagement occurs between V-shaped indent 255 and outer end 223, between V-shaped indent 257 and V-portion 225 and between inner end 221 and the juncture of curved end 259.

The board 238 is secured to wall 234 by the nails 244 which are forced through end walls 253 of certain of the channel members 240.

Mortar is introduced into the preformed grooves 263 defined by the channel members 240 in the manner described with reference to FIG. 3.

EXAMPLE

A facing structure 10 as illustrated in FIG. 1 was produced employing the assembly 82 of FIG. 6. Facing structure 10 had an elongate length of about 4 ft. corresponding to the width of fibre glass mat 96. The base 18 and tongue 20 each had a thickness of about 0.0625 inches and tongue 20 extended a distance of 1.0 inch from the underside of facings 12.

Base 18 supported four facings 12 each 11.5×2.5×0.125 inches; the slots 16 each had a width of 0.5 inches.

Facing structures 10 are light in weight and can be readily stacked in a compact formation without loss of space for storage, transport and handling.

During mounting to a surface 36 the structure 10 hangs from the upper edge (rear edge 13) so that the weight of base 18 and facings 12 urges the lower edge (front edge 11) against the mortared surface on mounting surface 36 and facing structure 10 is held closely against the mortared surface.

Employing the facing structures 10 a mounting surface 36 can be readily and rapidly faced.

The elongate length of the facing structure 10 and also of structures 56 and 68 provides a strong facing which can withstand stresses due to differentials in thermal expansion, impact and building movement. Concentrated loads which are generally the source of discernable cracks which propagate and cause degradation and failure are distributed throughout the elongate length and such distribution results in indiscernable micro-cracks which are harmless.

The tongue 20 and corresponding flanges 66 of facing structure 56 and rub 76 of facing structure 68 all have a significant length typically about 1.0 inch and provide good penetration into the mounting surface 36 for secure mounting.

The profile of the tongue 20, as described, serves to provide either a frictional engagement with the opposed walls 50 and 52 of the channel 40 or a mechanical engagement if the apices of the V-portions 28 and 30 penetrate walls 50 and 52.

It will be understood that the facing structures 10, 56 and 68 could comprise a single elongated plate-like facing on the elongate support and for producing such structures the wheel saw 118 of FIG. 6 would be omitted.

I claim:

1. An ornamental facing structure comprising:
   an elongate base member having first and second sides in opposed facing relationship, said base member having an upper edge and a lower edge,
   at least one facing member supported on said first side,
   at least one thin bar member integrally formed with said base member and extending generally perpendicularly from said second side, intermediate said upper and lower edges,
   said bar member being adapted to be received in a narrow elongate slot in a base structure to mount said facing structure on said base structure.

2. An ornamental facing structure according to claim 1, wherein said at least one bar member is elongate extending the full elongate length of said base member, said bar member having a thickness less than the thickness of said facing members 3. An ornamental facing structure according to claim 2, wherein said at least one bar member extends from said base member a distance significantly greater than the thickness of the bar member.

4. An ornamental facing structure according to claim 3, wherein said thickness of the at least one bar member is less than 0.125 inches.

5. An ornamental facing structure according to claim 1, which comprises a single said bar member extending generally perpendicularly from adjacent said upper edge of said base member, said bar member being an elongate bar member extending the full elongate length of said base member.

6. An ornamental facing structure according to claim 5, wherein said bar member has a corrugation running its elongate length.

7. An ornamental facing structure according to claim 6, wherein said corrugation comprises a pair of oppositely facing apices adapted to frictionally or mechanically engage opposed walls of said elongate slot.

8. An ornamental facing structure according to claim 7, wherein said base and bar members are integrally formed from a resin impregnated glass fiber mat.

9. An ornamental facing structure according to claim 1, wherein said at least one bar member comprises a single elongate bar member extending generally perpendicularly of said base member generally midway between said upper and lower edges of said base member, and extending the elongate length of said base member.

10. An ornamental facing structure according to claim 1, wherein said at least one bar member comprises upper and lower spaced apart, generally parallel elongate bar members extending the elongate length of said base member.

11. A compactly stackable ornamental facing structure comprising:
    an elongate base member having first and second major surfaces in opposed facing relationship, said base member having an upper edge and a lower edge,
    a plurality of rectangular facing plates having brick simulating surfaces supported on said first surface in regularly spaced apart, side-by-side relationship, to simulate a row of bricks separated by mortar,
    a thin, elongate bar member integrally formed with said base member extending generally perpendicularly of said second surface intermediate said upper and lower edges and adjacent said upper edge,
    said bar member extending the full elongate length of said base member, having a thickness less than 0.125 inches and extending from said base member a distance at least 10 times said thickness,
    said bar member being adapted to be fully received in a narrow elongate slot in a base structure to mount said facing structure on said base structure.

12. A simulated masonry wall comprising:
    a backing panel,
    a plurality of parallel, equally spaced apart narrow elongate slots in said panel, said slots being spaced apart by elongate mounting surfaces,
    a layer of mortar on each of said mounting surfaces,
    and a plurality of facing structures each of said facing structures comprising an elongate base member having first and second sides in opposed facing relationship, at least one facing member supported on said first side, a thin, elongate, bar member integrally formed with said base member and extending from said base member at an angle of slightly less than 90° to said second side, said bar member extending the full elongate length of said base member and extending from said base member a distance significantly greater than the thickness of the bar member, said facing structures being fixedly mounted in side-by-side relationship on each mounting surface with said layer of mortar, with said bar member of each of said facing structures received in a slot of said plurality.

13. A simulated wall according to claim 12, wherein said slots have a narrow opening effective to minimize entry of mortar into said slots during application of mortar to said backing panel to cover said mounting surfaces, such that said slots are substantially unfilled by mortar.

14. A simulated wall according to claim 13, wherein said slots have enlarged terminal ends within said panel effective to house mortar urged towards said terminal ends during entry of said bar members, mortar thus collected in said enlarged ends forming mechanical anchors for said bar members.

15. A simulated wall according to claim 12, wherein said narrow elongate slots comprise channel members embedded in said panel, said channel members having upper and lower spring loaded walls which snap together to engage the bar members of said facing structures.

* * * * *